Oct. 14, 1924.
P. WRIGHT
1,511,794
MACHINE FOR COLLECTING AND WEIGHING TIE WIRES
Filed Nov. 1, 1922    3 Sheets-Sheet 1
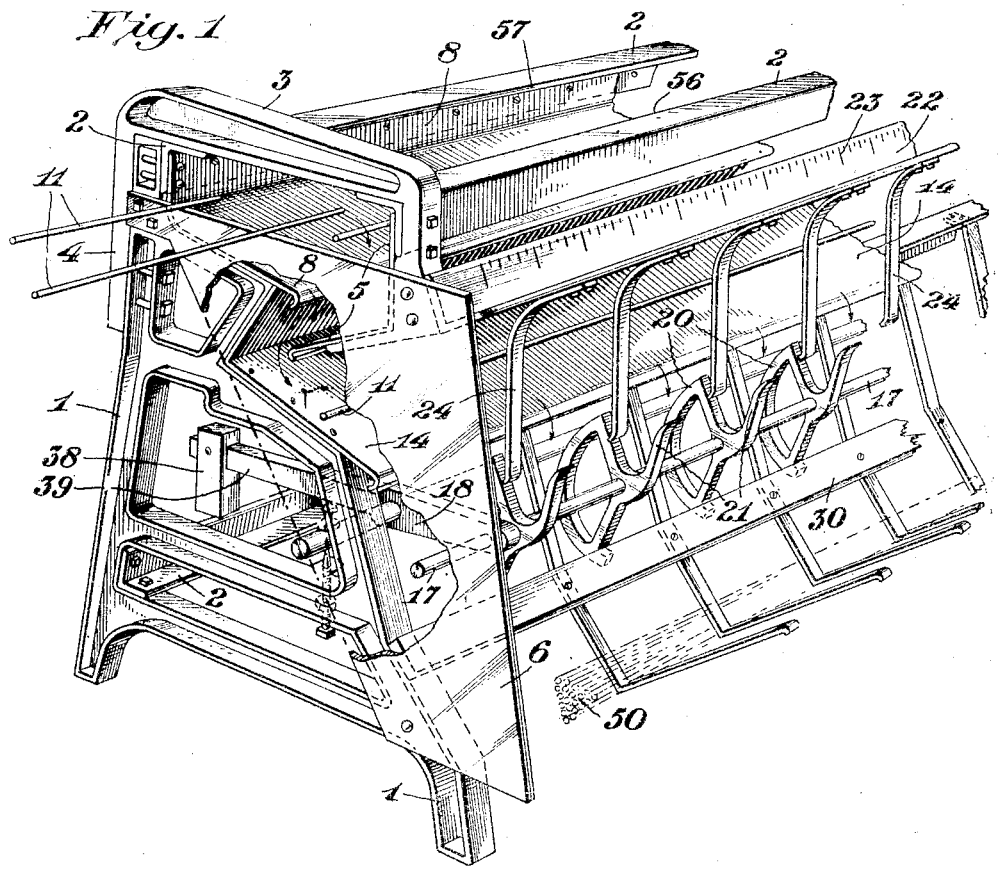
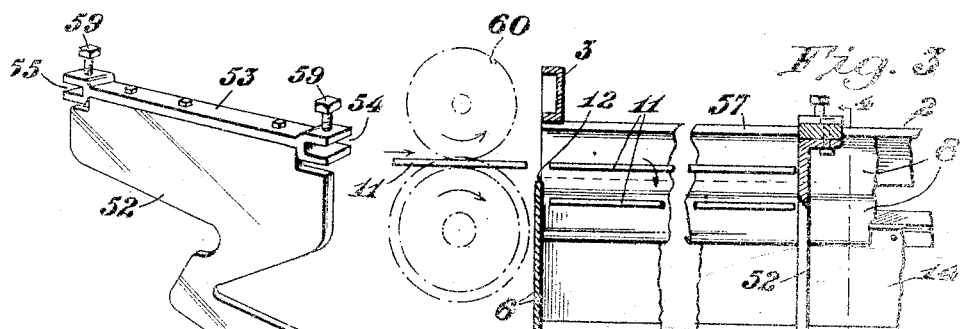
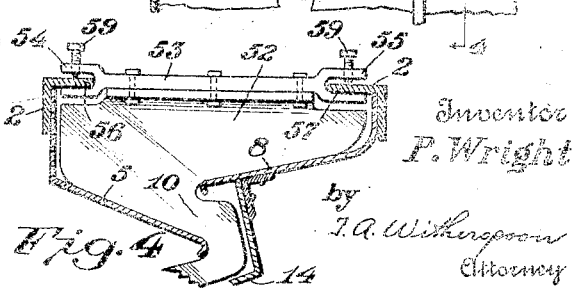
Inventor
P. Wright
by
J. A. Witherspoon
Attorney Oct. 14, 1924.
P. WRIGHT
MACHINE FOR COLLECTING AND WEIGHING TIE WIRES
Filed Nov. 1, 1922   3 Sheets-Sheet 2
1,511,794
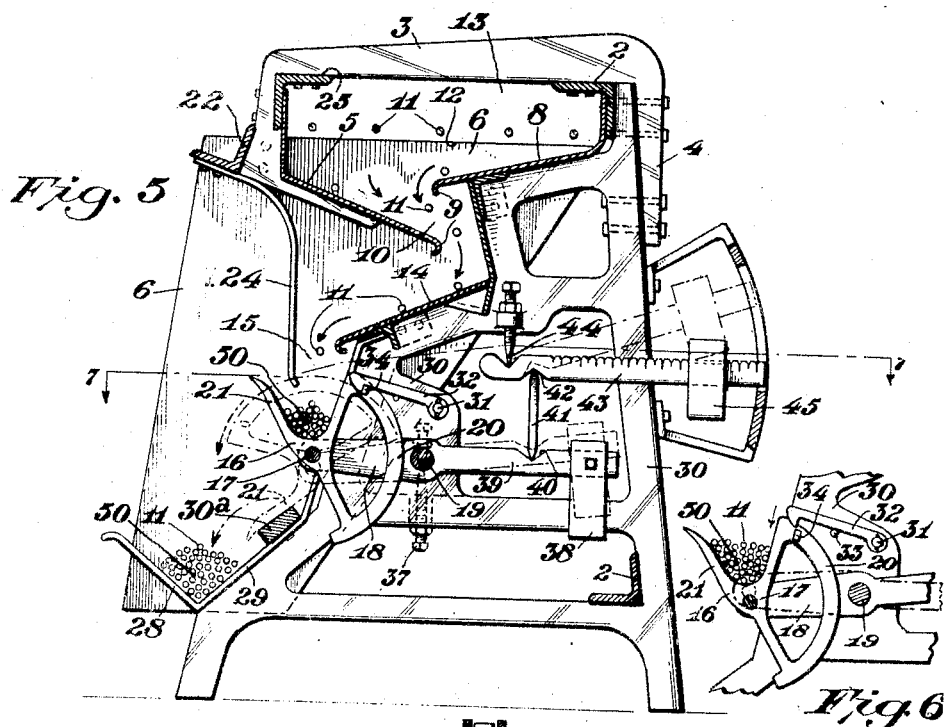
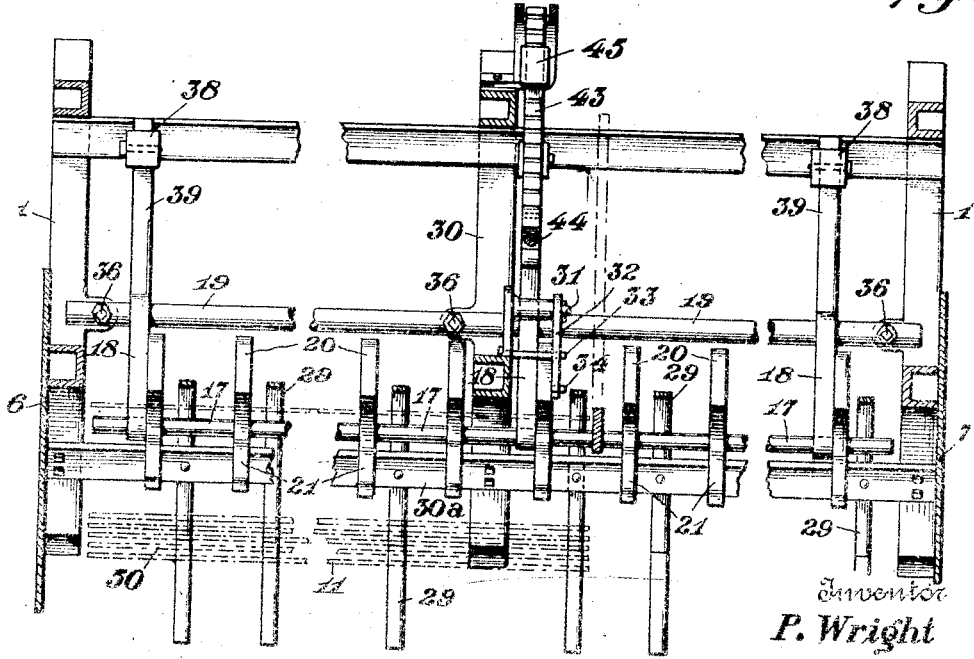

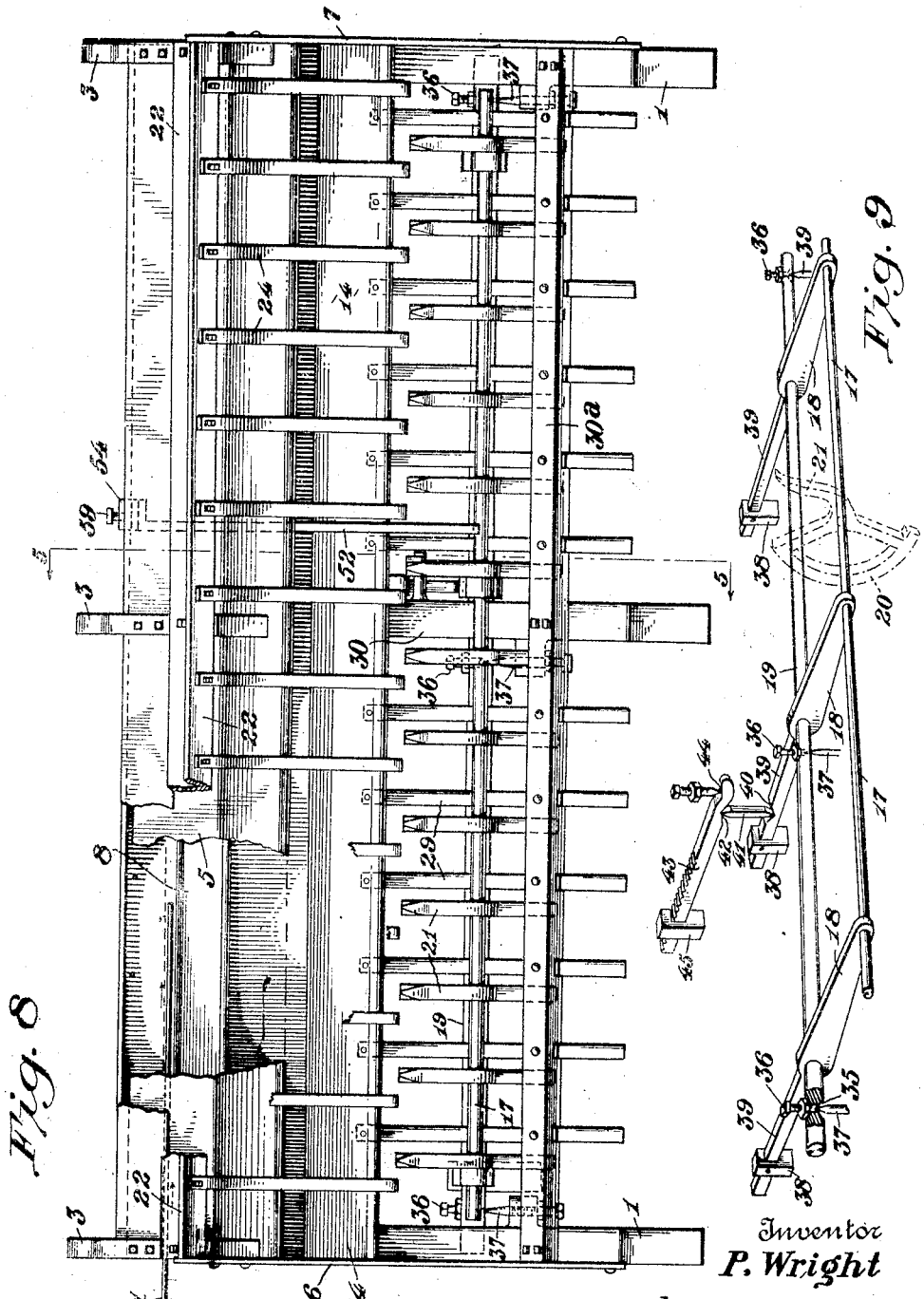

Patented Oct. 14, 1924.

1,511,794

UNITED STATES PATENT OFFICE.

PARVIN WRIGHT, OF CHICAGO, ILLINOIS.

MACHINE FOR COLLECTING AND WEIGHING TIE WIRES.

Application filed November 1, 1922. Serial No. 598,397.

*To all whom it may concern:*

Be it known that I, PARVIN WRIGHT, a citizen of the United States, residing at Chicago, in the county of Cook and State of Illinois, have invented certain new and useful Improvements in Machines for Collecting and Weighing Tire Wires; and I do hereby declare the following to be a full, clear, and exact description of the invention, such as will enable others skilled in the art to which it appertains to make and use the same.

This invention relates to a machine for collecting, weighing and bundling tie wires after they have been cut into predetermined lengths, and has for its object to provide a mechanism of this character which will be simple in construction, comparatively inexpensive to manufacture, and more efficient in use than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a perspective view partially broken away of a machine made in accordance with this invention;

Figure 2 is a perspective view of a movable gage plate for the wires;

Figure 3 is a fragmentary sectional view illustrating the position of the gage plate 52 with relation to the end plate 6;

Figure 4 is a sectional view taken on the line 4—4 of Figure 3, looking in the direction of the arrows;

Figure 5 is a sectional view taken on the line 5—5 of Figure 8, looking in the direction of the arrows;

Figure 6 is a detail partially sectional view illustrating the parts before the wires are dumped;

Figure 7 is a sectional view taken on the line 7—7 of Figure 5, looking in the direction of the arrows;

Figure 8 is a side elevational view partially broken away, of the parts shown in Figures 1 and 5; and Figure 9 is a perspective view of the weighing devices.

In order that the exact invention may be the more clearly understood it is said: Heretofore tie wires used for banding boxes and other packages after having been properly straightened and cut into predetermined lengths on a machine not shown, and forming no part of this invention, were allowed to drop onto a table or into a trough like receptacle where they were permitted to pile up in any quantity desired. Said tie wires were then segregated by hand and counted out or weighed into bundles of any desired size. The great multiplicity of wires constituting the bundle would often become tangled and crossed so that considerable trouble was experienced in getting the individual wires in position to form straight, even bundles, and also in getting the bundles exactly of the same size ready for binding the wires together into a package suitable for shipping.

In this invention, on the other hand, a mechanism is provided which receives these previously straightened and cut wires as they are cut off from the straightening and cutting machine not shown. The individual wires are allowed to drop from said straightening machine onto inclined surfaces which serve to lead the said wires into a cradle like receptacle of a weighing device. After the wires reach this said weighing device when a predetermined weight has accumulated, the scale like mechanism tips and the bundle is automatically dumped into a receptacle for holding the predetermined weight of wires until they are removed for tying together.

In addition to the foregoing features, the present invention also facilitates the bringing of all of the ends of the wires into the same vertical plane, and thus making the bundle more shipshape for the market.

Referring to the accompanying drawings, 1 represents any suitable framework provided with the angle members 2, extending from end to end of the machine and serving to hold the parts together. 3 represents a plurality of overhanging arms secured to the frames 1, as at 4, and these said arms 3 support the inclined table or platform 5 which likewise extends from one end of the machine to the other. At one end of the machine is the vertically disposed plate 6 and at the other end of the machine is the similar plate 7, as shown. Said inclined table 5 extends between the plates 6 and 7, as does the inclined plate 8, all as will be clear from Figures 1, 5 and 8. The inner edges 9 of the said plates 5 and 8 overlie one another, and are separated to form the space 10 as shown. The upper edge 12 of the vertically disposed end plate 6 is located below the plane of the overhanging arms 3 to form the space 13, through which the cut and straightened wires 11 pass from the straightening machine in order that they may fall upon the inclined tables 5 and 8, and thus may roll down said tables through the space 10 and onto the inclined table 14. From the table 14 said wires 11 pass down through the space 15 into the weighing device 16 pivoted on the rod 17 carried by the levers 18 pivoted on the rod 19, all as will be clear from the drawings. The said weighing device 16 is provided with a plurality of curved segments 20 spaced along the rod 17, and each segment is provided with a projecting hook like member 21 so that the entire set of segments and hook like members 21 constitute a cradle or receptacle for holding the said wires 11. The said overhanging arm members 3 are provided at their outer ends with the trough like member 22, which is preferably provided with the scale 23 for a purpose to be disclosed below. Attached to the underside of said trough like member 22 are a plurality of bent arms 24 preferably spaced to one side of the curved segments 20 and serving the function of preventing the wires 11 from traveling too far after they leave the inclined plate 14, preparatory to their passing down through the space 15 into the cradle like receptacle with which the weighing device 16 is provided. After a predetermined weight of wires has been received on the curved arms 21 constituting the cradle like receptacle, said arms 21 together with the shaft 17 revolve around the rod or beam 19 as a center from the full line position shown in Figure 5 to the dotted line position shown in said figure, whereupon the said wires 11 are dumped into the cradle like receptacle 28 formed by the individual bent members 29 which are spaced apart throughout the length of the machine and which are secured to the supporting member 30ª and to other portions of the framework as illustrated in the drawings. As the collection of wires 11 constituting a bundle 50 are received in the cradle 28 the individual curved segments 20 move from their full line position shown in Figure 5, to their dotted line position, there shown, and thus close off the opening 15, as will be clear from the drawings. Any additional wires 11 that may be fed to the machine during the dumping action will rest in said space 15 or collect there until the individual segments 20 are restored to their full line position in the manner to be disclosed below. In order to prevent the segments 20 from dumping before a predetermined weight has been collected, on the members 21, the following mechanism is provided:

On one central frame member 30, see Figures 5 and 6, there is pivoted as at 31 a pawl 32 whose downward movement is limited by the pin 33. On the corresponding segment 20 there is provided the pin or lug 34 with which said pawl 32 engages. As the wires 11 collect on the members 21, the pawl 32 by its engagement with the lug 34 prevents any dumping action. But as the weight of wires 11 accumulates the lever arm 18 gradually sags down around the rod 19 as a center, carrying with it the rod 17 and all of the members 21. This lowering of the members 21 gradually disengages the lug 34 from the pawl 32 and when the disengagement is complete, as is illustrated by the dotted and full line positions shown in Figure 6, the rod 17 together with all the cradle like members 21, passes down from the full line position shown in Figure 5 to the dotted line position shown therein, whereupon the wires 11 pass from the members 21 onto the members 29. The cradle formed by the members 21 being thus emptied the said members 20 and 21 will assume their normal position by reason of the segments 20 being heavier than the members 21, and also by reason of the weighted other arm of the lever 18 presently to be described.

As the individual segments 20 thus pass back from their dotted line position shown in Figure 5, to their full line position shown in said figure, they uncover the space 15 and any wires 11 which may have accumulated in said space are at once dumped onto the individual members 21, all as will be clear from the drawings.

The weighing portion of the mechanism is constructed as follows: The rod or beam 19 is provided with a plurality of slots 35 best shown in Figure 9 and secured in said beam opposite said slots are a plurality of pivoting members 36 having hardened curved surfaces coacting with the hardened pivoting points 37 supported in the framework of the machine as at 38, Figure 5.

It thus results that as the rod 17 and its coacting parts revolve around the beam 19 as a center said beam tips against the weights 38 with which the other ends 39 of the beams 18 are provided. Said weights are adjustable as indicated and one of said members 39 is provided with a notch 40 into which fits the member 41 coacting with the notch 42 of the scale beam 43 having its fulcrum at 44 and provided with the adjustable weight 45, all as will be readily understood. In other words, it is evident that by adjusting the weights 38 on the beam members 39 and then adjusting the weight 45 on the beam member 43, the segmental members 20 and 21 may be caused to tip at any predetermined desired weight of wires that are to constitute a bundle 50. It is further evident that owing to the weights just disclosed and to the preponderance of metal that resides in the segments 20, the parts are readily restored to their normal empty positions immediately after the dumping operation. The supporting member 30ª limits the downward movement of the members 21 in their dumping operation, and thus prevents the segments 20 from moving too far.

The end plates 6 and 7 serve as flat surfaces against which the bundle 50 of wires may be bodily moved by hand or by other means in order to get all of the ends in the same vertical plane, provided, of course, the wires are of substantially the same length as the machine. On the other hand, when the machine is made longer than it is desired to make a given delivery of bundles, then an extra or additional flat plate is provided, against which the ends of the wires may be evened, and by the means now to be described. Between said end plates 6 and 7 there is placed the movable plate member 52, see Figure 2, and which is substantially of the shape shown. Said plate member 52 is provided on its upper edge with the member 53 having the guide members 54 and 55 adapted respectively to slide along the flanges 56 and 57 of the upper angle bars 2, as will be clear from Figures 1, 3 and 4. This said plate 52, together with the members 54 and 55 are conveniently slid along the flanges 56 and 57 until the proper length for the wires is provided. In setting up this plate the scale 23 shows to the operator at once just where the said member 53 should be clamped, as by setting up on the screw 59.

The operation of this machine will be understood from the foregoing, but may be briefly summarized as follows:

Tie wires 11 after having been straightened and cut to predetermined lengths, are delivered from the cutting and straightening machine, not shown, but a portion of which is diagrammatically illustrated at 60 in Figure 3. These said tie wires pass from the said rollers 60 over the top edge 12 of an end plate 6 of the machine, whereupon their momentum carries them forward until they reach the opposing end plate 7 at the other end of the machine, or if the wires are of a shorter length, the momentum of the same carries them to an adjustable plate or "butting board" 52. The function of these said plates 7 or 52 is automatically to bring the outer ends of all of the wires as nearly as possible into the same vertical plane. After the inner ends of said wires have thus passed the edge 12 of the end plate 5, the body portions of the wires fall down upon the inclined tables or aprons 5 and 8, and through the action of gravity pass through the space 10 and fall down upon the plate 14, where they pass through the space 15 onto the projections 21 constituting a receptacle or cradle with which the weighing device 16 is provided. The said wires thus accumulate in this cradle until a predetermined weight thereof is had, whereupon the bundle 50 of wires thus formed is automatically dumped. The dumping action is caused by the construction which permits the rod 17 and the members 20 and 21 constituting the cradle to pivot around the weighing beam or rod 19 as a center. That is, as the bundle 50 increases in weight the lug 34 carried by one of the segments 20 leaves the pawl 32 as best indicated in Figure 6, and thus permits all of the segments 20 to move from the full line position shown in Figure 5 into the dotted line position shown in said figure, and to thus empty the members 21 of the bundle of wires 50 into the cradle like receptacle 28. While the wires are in the weighing machine or are in the cradle 28, they may be moved by hand if necessary, or by other means in a longitudinal direction against the front plate 6 or against the other plate 52 or 7, as the case may be, and thus may all of the ends of the wires be brought into the same vertical plane at each end of the bundle before tying the wires together to form a bundle preparatory to shipping. The weighing machine portion of the invention operates as follows:

The weighing beam or rod 19 is provided with a plurality of notches 35 as best shown in Figure 9, and screwed or otherwise secured in said rod are a plurality of members 36 which are of hardened steel and have lower curved surfaces forming the upper portions of said notches 35. Lock nuts may be provided to hold the members 36 firmly in place. Pivoting points 37 of hardened steel coact with the members 36 so that when the rod or beam 19 rotates on its axis, the friction between the members 36 and 37 is reduced to a minimum. The rod 17 is supported by one end 18 of a plurality of scale beams whose other ends 39 are provided with weights 38 as shown. One of said ends 39 is notched as shown at 40, see Figures 5 and 9, and coacts with another scale beam 43 having its fulcrum at 44 and an adjustable weight 45 playing thereover in the usual manner. It thus results that according to the position of the weight 45 the bundle of tie wires 50 will be dumped. That is, by setting the weight 45 at a predetermined point on the scale the machine will automatically dump bundles of wires 50 into the cradle 28 as fast as they accumulate on the members 21.

As the cutting and straightening machine by means of the rollers 60 is constantly feeding wires 11 into the machine it is desirable that no wires shall reach a bundle 50 after a predetermined weight is accumulated, and to prevent this the segments 20 when they move from their full line position shown in Figure 5 to their dotted line position effectually close off the space 15 and prevent any extra wires from reaching the bundle 50 after the latter has been completed. On the other hand, when the members 21 have been emptied of their wires 50, the preponderance of metal in the segments 20 and in the weighing machine proper, cause the parts to automatically go back to their normal empty positions shown in full lines in Figure 5. The pawl 32 is supported on the lug 33 and is thus prevented from following the downward movement of the lug 34 on the segment 20, so that the various segments 20 are held in their empty positions by the pawl 32 until the predetermined weight of the bundle has been reached, whereupon the lug 34 leaves the pawl 32 as illustrated in Figure 6, and permits the dumping action. The additional adjustable "butting board" or evening plate 52 is readily shifted from place to place in the machine to suit the varying lengths of the wires required for different orders of bundles, by means of the scale 23 which runs from one end of the machine to the other, as will be clear from Figure 1.

It is preferred to use ball bearings not shown wherever friction is to be avoided. The scale 23 on the front of the machine, in addition to showing the operator just where the plate 52 should be placed, also enables the operator to observe the lengths of the wires as they come in and thus to assure him that the machine is delivering the proper lengths for the bundles he is making up. As these wires are passed from the straightening machine at the rate of about six feet per second, it is evident that the whole operation is very rapid, and that therefore a scale such as 23 is very useful in testing the lengths that are being delivered, and that the "butting boards" such as 52 and 7 are very useful in destroying the momentum of the wires, and at the same time getting them all evened up without tangling, as has been heretofore experienced.

It is obvious that those skilled in the art may vary the details of construction as well as the arrangement of parts without departing from the spirit of the invention and therefore it is not desired to be limited to the foregoing disclosure except as may be required by the claims.

What is claimed is:

1. In a machine for collecting tie wires in bundles, the combination of a frame work; an inclined table supported by said frame work adapted to receive and guide said tie wires; a collecting means into which said tie wires may pass from said table; and means against which the ends of said wires may strike before reaching said collecting means, substantially as described.

2. In a machine for collecting tie wires in bundles, the combination of a frame work; a plurality of inclined tables supported by said frame work adapted to receive and guide said tie wires; a collecting means into which said tie wires may pass from said tables; and means against which the ends of said wires may strike before reaching said collecting means, substantially as described.

3. In a machine for collecting tie wires in bundles the combination of a frame; a plurality of inclined tables supported by said frame adapted to receive and guide tie wires fed thereto; a weighing means to which said wires are guided; and receiving means into which said wires are passed after being weighed, substantially as described.

4. In a machine for collecting tie wires in bundles the combination of a frame; an inclined table supported by said frame adapted to receive and guide tie wires fed thereto; a weighing means to which said wires are guided; receiving means into which said wires are passed after being weighed; and means against which the ends of said wires may strike to render them even in the bundle, substantially as described.

5. In a machine for collecting tie wires in bundles, the combination of a frame; a weighing means for the collected wires; a plurality of inclined tables for guiding said wires to said weighing means; and means for automatically delivering the weighed wires into a receptacle, substantially as described.

6. In a machine for collecting tie wires in bundles, the combination of a frame; a weighing means for the collected wires; a plurality of inclined tables for guiding said wires to said weighing means; means for automatically delivering the weighed wires into a receptacle; and means against which the ends of the individual wires may strike before said delivery takes place, substantially as described.

7. In a machine for collecting tie wires in bundles, the combination of a frame; a weighing means comprising a swinging cradle for the collected wires; a plurality of inclined tables for guiding said wires to said weighing means; means for automatically delivering the weighed wires into a receptacle; and a flat surface disposed in a vertical plane against which the ends of said wires may strike before the wires are weighed, substantially as described.

8. In a machine for collecting tie wires in predetermined quantities, the combination of a weighing device; means for automatically delivering said wires in parallel relations to said device; means for bringing the ends of said wires into substantially the same plane prior to said delivery; and means for automatically discharging said wires from said weighing device after a predetermined weight has been reached, substantially as described.

9. In a machine for collecting tie wires in bundles the combination of a weighing means comprising a plurality of segments having hook-shaped receiving members to form a cradle; means to continuously feed wires to said cradle until a predetermined quantity has been received; and means to prevent wires from entering said cradle after said quantity has been received, substantially as described.

10. In a machine for collecting tie wires in bundles the combination of a weighing means comprising a plurality of segments having hooked shaped receiving members to form a cradle and comprising a pivoted scale beam and an adjustable weight; means to continuously feed wires to said cradle until a predetermined quantity has been received; and means associated with said segments to prevent wires from entering said cradle after said quantity has been received, substantially as described.

11. In a machine for collecting tie wires in bundles the combination of a weighing means comprising a pivoting member, a plurality of segments adapted to move around said member as a center, and having hooked shaped receiving members to form a cradle; means to continuously feed wires to said cradle until a predetermined quantity has been received; and means to prevent wires from entering said cradle after said quantity has been received, substantially as described.

12. In a machine for collecting tie wires in bundles the combination of a pivoting rod like member, a weighted beam secured to and swinging with said member; a rod supported by said beam; a plurality of segments having hook like members adapted to swing around said rod as a center and forming a cradle for said tie wires; means for preventing said segments from moving around said rod until a predetermined weight of wires is in said cradle; and means for feeding wires to said cradle, substantially as described.

13. In a machine for collecting tie wires in bundles the combination of a pivoting rod like member, a weighted beam secured to and swinging with said member; a rod supported by said beam; a plurality of segments having hook like members adapted to swing around said rod as a center and forming a cradle for said tie wires, means for preventing said segments from moving around said rod until a predetermined weight of wires is in said cradle; means for feeding wires to said cradle; and means for preventing wires from entering said cradle after a predetermined weight of the same have been fed thereto, substantially as described.

14. In a machine for collecting tie wires in bundles the combination of a rotatable dumping cradle comprising a plurality of segments having hook shaped receiving members; means for returning said cradle to its normal position after the dumping operation; means to hold said cradle against its dumping action until a predetermined weight of wires has been received therein; and means for continuously feeding wires in parallel relation to said cradle, substantially as described.

15. In a machine for collecting tie wires in bundles the combination of a rotatable dumping cradle comprising a plurality of segments having hook shaped receiving members; means for returning said cradle to its normal position after the dumping operation; means to hold said cradle against its dumping action until a predetermined weight of wires has been received therein; means to release said holding means after said predetermined weight has been received; and means for continuously feeding wires in parallel relation to said cradle, substantially as described.

16. In a machine for collecting tie wires in bundles the combination of a rotatable dumping cradle comprising a plurality of segments having hook shaped receiving members; a rod around which said cradle may oscillate as a center; a pivoted rod like scale beam around which said rod and cradle may oscillate as a center; means for returning said cradle to its normal position after the dumping operation; means to hold said cradle against its dumping action until a predetermined weight of wires has been received therein; and means for continuously feeding wires in parallel relation to said cradle, substantially as described.

17. In a machine for collecting tie wires the combination of a frame work comprising an overhanging member; a plurality of oppositely inclined tables supported by said frame work leaving an open front portion for the discharge of long lengths of wire, and means for segregating said wires into bundles of a predetermined weight, substantially as described.

18. In a machine for collecting tie wires the combination of a frame work comprising an overhanging member; a plurality of oppositely inclined tables supported by said frame work leaving an open front portion for the discharge of long lengths of wires; means for segregating said wires into bundles of a predetermined weight; and measuring means to readily ascertain the length of wire in said bundles, substantially as described.

19. In a machine for collecting tie wires the combination of a frame work comprising an overhanging member; a plurality of oppositely inclined tables supported by said frame work leaving an open front portion for the discharge of long lengths of wire; and means comprising a longitudinally disposed pivoted supporting shaft and a cradle and weighing means associated therewith for segregating said wires into bundles of a predetermined weight, substantially as described.

20. In a machine for collecting tie wires in bundles the combination of inclined means for conveying said wires to a predetermined point; means against which the ends of said wires may strike before reaching said point; and means for segregating a predetermined weight of said wires into a bundle at said point, substantially as described.

21. In a machine for collecting tie wires in bundles the combination of inclined means for conveying said wires to a predetermined point; adjustable means against which the ends of said wires may strike before reaching said point; and movable means for segregating a predetermined weight of said wires into a bundle at said point, substantially as described.

22. In a machine for collecting tie wires in bundles, the combination of inclined means comprising a plurality of inclined tables for conveying said wires to a predetermined point; adjustable means against which the ends of said wires may strike before reaching said point; and means for segregating a predetermined weight of said wires into a bundle at such point, substantially as described.

In testimony whereof I affix my signature.

PARVIN WRIGHT.